June 4, 1957  E. M. MAY  2,794,424
TRANSMITTER-CONTROLLED HYDRAULIC SERVOMOTOR APPARATUS
Filed Sept. 29, 1953
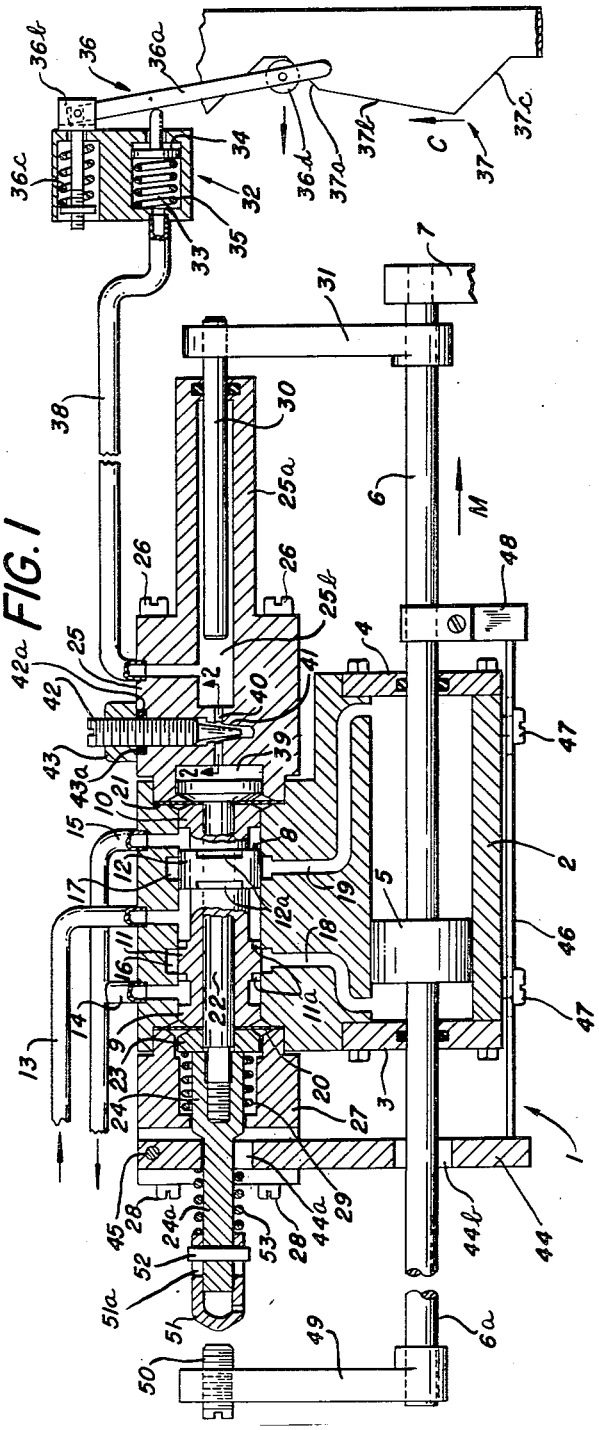
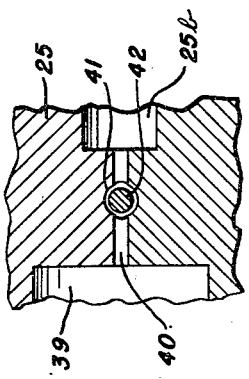
INVENTOR.
BY Edward M. May
Gehr and Leonard
ATTORNEYS

United States Patent Office 2,794,424
Patented June 4, 1957

2,794,424

TRANSMITTER-CONTROLLED HYDRAULIC SERVOMOTOR APPARATUS

Edward M. May, Detroit, Mich., assignor to Meco-Pilot Manufacturing Company, Royal Oak, Mich., a corporation of Michigan Application September 29, 1953, Serial No. 382,960

5 Claims. (Cl. 121—41)

This invention relates to hydraulic transmitter-controlled positional servomotor apparatus and particularly to such apparatus in which a high power output element travels a distance proportional to the travel of a low power input element. This is in distinction from regulating servomotor apparatus intended to maintain a condition such, for example, as temperature, speed, or flight attitude.

In such positional servomotor apparatus as heretofore proposed, the admission and exhaust of working fluid to and from the servomotor is controlled by a valve, usually of the cylindrical or spool type, which has a transverse pressure surface exposed to a receiver chamber that is connected through suitable conduit means with a fluid pressure transmitter which may be actuated either manually or by some automatic means, means for exerting a biasing force on the valve in opposition to the transmitter pressure being provided in the form of fluid pressure, a biasing spring, or other equivalent means. In such prior apparatus the receiver chamber is also in free communication with a displacement chamber, and means is provided to effect displacement of liquid in the displacement chamber proportional to the movement of the movable element of the motor to provide the desired follow-up action. The displacement means may take any one of various forms capable of accurately effecting the proportional displacement, a commonly-used means consisting of a movable rod or plunger extending into the chamber and exteriorly connected to the movable element of the motor. In the case of a reciprocating type motor a direct rigid connection of the displacement rod or plunger to the movable motor element has been used, while in the case of a rotary motor the movement of the rotating motor element has been transmitted to the displacement member through means for converting the rotary movement to the reciprocating movement needed for the displacement rod.

In prior applications of such apparatus if the valve means of the motor was designed to provide accurate and sensitive response of the motor output to the transmitter input unduly slow motor operation was necessary in order to avoid serious hunting and vibration of the apparatus. This in turn seriously limited the capacity of the apparatus driven or controlled by the hydraulic mechanism and in applications such, for example, as the operation of machine tools, correspondingly limited the usefulness of the hydraulic type of system.

It is the general object of the present invention to provide an improved hydraulic apparatus of the type above identified in which the weakness or limitation which has been pointed out is very largely overcome.

Another object of the invention, ancillary to that stated, is to provide a hydraulic transmitter-controlled servomotor of the positional type, which comprises a single adjustable means constructed and arranged to control the velocity of the follow valve movement so as to counteract the effect of either unduly rapid input movements of the transmitter or of shock in the output of the apparatus such, for example, as sudden change of the motor load.

A further object of the invention is to provide a hydraulic servomotor-driven apparatus of the type in question which is capable of relatively high speed motor operation and sudden stopping without serious hunting and resultant vibration and in which very low power transmitter means can be employed to control the motor.

It is also an object of the invention to provide apparatus having the improved characteristics which have been noted and which is also characterized by simplicity of construction, ease of adjustment and reliability of operation.

With the above objects in view the invention consists in certain forms, arrangements and combinations of parts hereinafter described in connection with the accompanying drawing of a preferred embodiment of the invention and particularly pointed out in the claims appended to the description.

In the drawing,

Fig. 1 is a sectional view of a transmitter-controlled servomotor apparatus of the follow valve type, the showing of conventional parts of the apparatus being to some extent diagrammatic in character.

Fig. 2 is an enlarged section on the line 2—2 of Fig. 1.

From what has already been said about the variety of forms of previously-known apparatus it will be understood that in selecting the type of construction illustrated for the purpose of explaining the present invention, it is not intended to limit the invention to such construction except as may be indicated by the appended claims which are to be construed to cover mechanical equivalents of the structures illustrated and described.

Referring in detail to the construction illustrated, 1 generally designates a servomotor having relatively movable power elements comprising a cylinder block 2 with a main bore closed by heads 3 and 4 and, in the cylinder bore, a movable piston 5. The piston has a rod 6 to which is connected a part 7 of an output device to be driven or controlled, such as the suitably supported and guided cutter holder of a machine tool, or the movable work support of such a tool.

The cylinder block is formed with a second bore to receive the slidably mounted control valve generally designated by the numeral 8. The valve is generally cylindrical in form and has circumferential grooves forming head sections 9 and 10 and active valve lands 11 and 12. A fluid pressure supply conduit 13 is arranged to communicate with the valve groove between the lands 11 and 12, while exhaust conduits 14, 15 communicate with the valve grooves between the respective heads and adjacent lands of the valve. The lands 11 and 12 cooperate in well known manner with annular grooves 16 and 17 in the walls of the block structure and these annular grooves communicate through conduits 18 and 19 with the respective ends of the motor cylinder chamber.

As shown, the valve lands 11 and 12 are wider than their cooperating annular grooves 16 and 17 and are formed with circumferentially-extending port notches 11a and 12a, the axial width of the notches being such that the part of each land between opposite notches is of substantially the same axial width as its cooperating groove 16, or 17, and serves to cover the annular groove or port when the valve is in its neutral position. It will be noted that the circumferential extent of the valve notches 11a and 12a is relatively large. The reason for this will later be explained.

Hydraulic packings between the valve bore of the cylinder block and the ends of valve 8 are provided by annular diaphragms 20 and 21 of flexible sheet material, the inner edge of diaphragm 21 being clamped to the head 10 of the valve by the head of a bolt 22 extending through the valve body axially while the inner edge of diaphragm 20 is secured to the other head 9 of the valve by washer 23 and nut 24. The outer edge of the diaphragm 21 is secured to the cylinder block by means of a rigid clamping block 25, which is removably connected to the cylinder block by screws 26, 26. In similar manner the periphery of diaphragm 20 is secured to the cylinder block by clamping block 27 which is connected to the cylinder block by screws 28, 28. A biasing spring 29 is interposed between the washer 23 and a shoulder formed in the bore of block 27. The clamping block 25 is integrally formed with an axial extension 25a and the block and extension are bored out to form a chamber 25b. In this chamber is arranged a displacement rod or plunger 30, the outer end of which is rigidly connected by an arm 31 to the piston rod 6 so that movement of the latter is transmitted to the rod 30.

The numeral 32 generally designates a diagrammatically shown hydraulic transmitter mechanism of the character fully disclosed in my United States Patents Nos. 2,607,196 and 2,580,686. It comprises a cylinder 33 in which is mounted a piston 34 subject to the biasing effect of a spring 35 together with a lever-type piston actuator 36. The actuator 36 comprises a lever 36a arranged to engage a rod extension of piston 34, a bolt 36b having a swivel support on the cylinder 33 and formed with a slotted head in which the lever 36a is pivoted, and a spring 36c which yieldingly holds the bolt 36b in its normal working position but permits axial movement of the bolt in one direction. Actuator lever 36a is arranged to be driven by a movably mounted cam 37, the lever being fitted with an anti-friction roller 36d which engages the active surface of the cam and serves as a follower therefor. The cam 37 is of a characteristic form suitable for the actuation of a machine cutter, the cam slope 37a serving to advance the cutter rapidly to the work while slope 37b provides the slower cutting feed and slope 37c the retraction movement of the motor and tool.

The cylinder 33 of the transmitter communicates through an unrestricted conduit 38 with the displacement chamber 25b of the block 25. The inner end of the block 25 is formed with a recess the walls of which, together with the diaphragm 21 and the head of bolt 22, form a receiver chamber 39. This chamber communicates with the follow rod displacement chamber 25b through a restrictor passage 40 of rather small diameter. This passage is intersected at right angles by a tapered hole 41 of larger diameter than the passage and in this hole is arranged the correspondingly tapered end of a screw 42. A packing 42a serves to seal screw 42 against fluid leakage. The screw is fitted with a lock nut 43 which serves to secure the screw in any desired position of adjustment in relation to the wall of the tapered hole 41. Thus, as is shown in Fig. 2, two parallel passageways are formed around the tapered end of the screw when the latter is not fully seated, said parallel passageways being of uniform capacity throughout their lengths. By making the taper angle of the screw and hole small and providing the screw with a thread of fine pitch the effective capacity of the passage 40 leading into the receiver chamber 39 can quite easily be adjusted with great nicety.

The servomoter is fitted with stop devices of the general character disclosed in my Patent No. 2,580,686. One of the devices comprises a lever 44 pivotally connected by pin 45 to the clamping block 27. The lever is formed with an aperture 44a to receive a reduced cylindrical extension 24a of nut 24 and engage a beveled shoulder of the nut. The cylinder block 2 is fitted with a slide bar 46 which is supported by screws 47, 47 in position to be engaged at one end by the free end of lever 44 and at its other end by an arm 48 clamped to the piston rod 6.

The other stop device comprises an arm 49 mounted on an extension 6a of piston rod 6 and fitted with an adjustable contact screw 50 disposed to engage a contact cap 51 slidably mounted on nut extension 24a of the valve assembly. Cap 51 is slotted at 51a to engage a pin 52 fixedly mounted in extension 24a so that the cap can have a limited movement on the extension against the tension of a compression control spring 53 which is interposed between the cap and the lever 44 and holds the lever in contact with the beveled shoulder of nut 24.

In the operation of the apparatus the cyclical movement of the motor as determined by the cam of the character shown may be briefly described as follows:

With the cam advancing in the direction of the arrow C the cam slope 37a has engaged the follower roller 36d and caused the transmitter 32 to advance pressure fluid through conduit 38 to displacement chamber 25b, thence through the restrictor passage 40 into the receiver chamber 39, where pressure on the exposed end of the valve assembly moves the valve 8 to the left to connect the rear end of motor cylinder 2 with the pressure fluid and the front end of the cylinder with exhaust. The motor piston is thus advanced at a speed proportionate to the cam slope 37a to advance the cutter to the work in the well known manner characteristic of follow valve motors. As the cam slope 37b passes under the follower 36d the motor piston continues to advance but at the slower rate suitable for the cutting feed of the tool. When the high end of the cam slope 37b reaches the follower the suitably adjusted stop screw 50 engages the stop cap 51 of the valve assembly to move the valve to neutral position and stop the advance movement of the motor. With continued movement of the cam the cam follower engages the top of the downward slope 37c of the cam and the biasing spring 35 of the transmitter and the biasing spring 29 of the motor valve assembly are permitted to retract the transmitter piston 34 to move the valve 8 to the right of its neutral position and reverse the motor, the speed of the motor in the reverse direction being controlled by the cam slope 37c. As the cam follower approaches the bottom of cam slope 37c the stop arm 48 engages bar 46 and causes lever 44 to move the motor valve to its neutral position and stop the motor. By the use of an endless circular cam the described cycle may be repeated indefinitely.

It will be apparent that where the motor is fitted with the follow rod as shown in the drawing and described above the movement of the motor piston and output device actuated by it will be controlled in known manner to conform in amount, speed and direction with the movement of the transmitter effected by the actuating cam and the biasing spring of the transmitter piston.

For an understanding of the character and significance of the control effected by the restrictor passage 40 and its adjustable screw 42 it should be borne in mind that the slope of the transmitter driving cam is a measure of the speed of the motor piston and that undesirable hunting, which the present invention seeks to avoid, is due to too rapid movement of the control means or to too sudden change of the motor load, each of which conditions develops unduly large inertia effects and unduly rapid acceleration or deceleration of the motor piston. It should also be observed that in a transmitter-controlled servomotor it is desirable that the travel of the motor valve be kept as small as possible because it is the chief source or cause of error or discrepancy between the input (transmitter) movement and the output (motor piston) movement when both elements are traveling at speed. In accordance with the present invention the valve movement is limited, without reducing motor speed, by making the circumferential extent of the valve notches 11a, 12a relatively large so that the valve ports are of large capacity notwithstanding the small valve movement. However, such increase in the circumferential extent of the valve ports renders the opening and closing action of the valves very rapid or abrupt. This tends to result in hunting of the assembly and serious vibration of the apparatus, but by the present invention that result is prevented by limiting and controlling the speed of the valve movement by adjustment of the capacity of the passage 40 leading into the receiver chamber 39. Such adjustment and control of the apparatus is in practice very easily accomplished by the use of the adjustable screw. In starting an operation with the apparatus the screw is first adjusted in the opening direction, while cycling the apparatus, until hunting action starts, whereupon the screw is closed slightly or just far enough to stop the hunting and then locked in the adjusted position. This brings about a smooth operation and substantially accurate response of the output to the input movements of the transmitter.

With the earlier brief outline of the operative cycle in mind the operation may now be reviewed in greater detail.

As the motor piston starts its movement toward the right under control of the cam 37 the movement of the cam follower may be so rapid that corresponding movements of the follow valve 8 and piston 5 would be fast enough to result in hunting. However this result is prevented by the action of the restrictor passage 40 which greatly reduces the rate at which control fluid is forced into the receiver chamber 39 by the transmitter and correspondingly moderates the speed of the valve movement, this action being permitted by the compressive shortening of the transmitter spring 36c to accommodate the cam movement. The result is a slower rate of acceleration of the motor piston than would occur without the restrictor action. During the brief period of acceleration the spring 36c is compressed and re-expands and meanwhile the follow valve 8 moves to wide-open position and the motor piston 5 momentarily attains a speed greater than is called for by the cam slope 37a. But with the re-expansion of spring 36c control valve 8 partially closes and the speed and positional relation of the piston 5 again conform to the speed and position of the cam. This involves at least one cycle of hunting and is unavoidable, but even this momentary discrepancy between the input and the output of the apparatus occurs in a part of the work cycle when there is no cutting action so that work accuracy is not affected even momentarily.

At the end of the rapid advance of the motor piston the cutter engages the work and the added load aids the transition to the slower cutting feed prescribed by the cam slope 37b so that there is no danger of hunting at this transition point.

At the end of the working stroke of the motor piston, if it is driven at safe speed, the stop screw 50 strikes contact cap 51 of the control valve assembly and moves the valve to neutral against the tension of transmitter spring 36c. However, if the motor piston is driven to the right at a speed fast enough to cause hunting when suddenly stopped, then oil trapped in the receiver chamber 39 by the restrictor passage 40 will offer resistance to the valve movement and cause compression of the control spring 53 momentarily. Also the motor piston 5 will over-shoot but then quickly return to normal as control spring 53 re-expands.

Similarly, in the return stroke of the motor piston to the left (effected by cam slope 37c), if the piston is driven at safe speed, stop arm 48 will push the lever 44 to the left to move valve 8 to neutral. But if the piston speed is too high, the movement of the valve by the stop means will compress the control spring 53 and, because of the restrictor 40, will draw a partial vacuum in the receiver chamber 39. Correspondingly motor piston 5 will momentarily over-shoot to the left but return to position as control spring 53 re-expands. Because of the resilient nature of the vacuum formed in chamber 39 there may be a second, reverse over-shooting of the motor valve and piston but this will be effectively damped by control fluid flowing through the restrictor. Thus it will be seen that the action of the restrictor passage 40 between the follow-up displacement chamber and the receiver chamber in conjunction with the action of the spring 36c or the control spring 53, by quickly and effectively damping incipient hunting of the motor, makes possible the starting and stopping of a much more rapid motor movement than has heretofore been possible without causing very serious hunting.

From the foregoing description of the operation it will be seen that the control spring 53 of the valve assembly must have enough tension, combined with tension of return spring 29, to overcome the tension of spring 36c, bearing in mind that the transmitter may be under full pressure when stopping motor movement to the right. When stopping motor movement to the left, control spring 53 must have more tension than biasing spring 29 in order to move valve 8 to neutral. In a particular design of the apparatus, spring 29 has a tension of 5 pounds, this being needed to force control fluid back through conduit 38 to permit a motor piston speed of 8" per second. Control spring 53 then needs a tension of 7 pounds to overcome the tension of spring 29 plus valve friction. The two tensions combined (12 pounds) must overcome spring 36c which may have an effective tension of ten pounds, or double the tension of spring 29. This allows a five pound pressure to force control fluid forward through conduit 38.

With an effective area of diaphragm 21 of ⅓ of a square inch, the maximum force of the vacuum in the receiver chamber 39 is five pounds. Control spring 53 at seven pounds tension has only a two pound excess over the five pound tension of spring 29 so that the five pound vacuum is sufficient to compress control spring 53 for stopping motor movement to the left.

As has been indicated, the desired elimination of the error between the input transmitter movement and the output motor movement is achieved by minimizing the valve movement. In practice I have reduced the valve travel needed to give full motor speed to as little as .003", and with a valve diaphragm (part 21) effective area of ⅓ square inch it is clear that the volume of oil passing through the control passage is exceedingly small. In fact it amounts to scarcely one drop. This indicates the very remarkable character of the control effected by the adjustable screw.

While the design of the valve with the flow control means can be modified in various ways it is noted that the location of the adjustable screw in the design illustrated is particularly advantageous since its controlling effect is applied to counteract disturbances in the action of either the transmitter device or in the output part of the apparatus. Thus the screw regulation is effective against any condition causing sudden and unduly rapid movement of the transmitter piston, and it is also effective against a sudden increase of the output load reflected through the follow rod. This double effect of the regulating screw is of course secured by placing the displacement chamber in communication with the conduit connecting the transmitter cylinder with the receiver chamber of the valve at a point between the transmitter and the regulating screw device. This permits a construction, such as is shown in the drawing, with the displacement chamber 25b and the transmitter conduit 38 joining at a point relatively close to the receiver chamber 39. This in turn makes it possible to employ a member 25, 25a forming the fixed walls of the receiver and displacement chambers which is of a massive and rigid design and which, when rigidly clamped to the valve casing, provides a structure which is little liable to vibration. Also the arrangement keeps the conduit 38 free and unobstructed so that its length can be considerable and still permit the use of a low power transmitter that can be actuated by light sheet metal cams such as are disclosed in Patent No. 2,607,196.

The form of the adjustable restrictor device herein shown and described has been found especially advantageous in that it is not subject to clogging with impurities usually present in the hydraulic fluid of the apparatus. The reason for this appears to be that the parallel passages around the tapered end of the screw are of uniform caliber from end to end for all adjustments and that sharp corners or re-entrant passage boundaries are avoided.

From what was said early in the description it will be understood that a specific form of apparatus has been shown and described for purposes of explanation and is not intended to indicate limitations on the application of the present improvements. For example, it will be apparent that the improvements may be applied in motor applications such as are illustrated in Fig. 1 of my previously-mentioned Patent No. 2,580,686, in which the yieldable stop cap 51 of my improved apparatus may be arranged to engage or be engaged by an unyielding stop member, as herein disclosed, or to engage or be engaged by a template and function as a tracer.

Again it will be apparent that the yielding action of the transmitter spring 36c, in so far as its cooperation with restrictor 40 is concerned, can be introduced at any point between the cam follower and the restrictor 40. The arrangement of the spring 36c in conjunction with transmitter lever 36 as herein disclosed, has been preferred since it permits the additional useful functioning of the spring for purposes disclosed in my previously-mentioned patents and for the purpose of quickly checking tentative designs of the actuating cam, the visable yielding movement of the pivot bolt 36b serving to indicate, for example, that a particular cam slope 37a for advancing a cutter to its work would be unduly steep.

What is claimed is:

1. Hydraulic transmitter-controlled positional servomotor apparatus comprising a hydraulic motor having working chamber and piston power elements; a movably mounted valve for controlling admission and exhaust of working liquid to and from the working chamber of the motor; and means for actuating and controlling the valve comprising yieldable biasing means for moving it in one direction, a liquid receiver chamber, pressure-responsive means connected to the valve and exposed to the pressure of liquid in the receiver chamber for moving the valve in the opposite direction, a liquid transmitter, means for actuating the transmitter, liquid conduit means connecting the transmitter and receiver chambers comprising an unrestricted passageway connected at one end to the transmitter chamber and a restricted passageway connected with the other end of the unrestricted passageway and with the receiver chamber, adjustable means for varying liquid flow through the restricted passageway to and from the receiver chamber, a follow-up displacement chamber in free communication with the unrestricted passageway, means operatively connected with the movable member of the motor to effect displacement of liquid in the displacement chamber proportional to the motor movement, and relief means operatively connected with the transmitter and the unrestricted passageway constructed to yield only under a predetermined transmitter pressure greater than the opposing force of the biasing means on the valve.

2. Apparatus as claimed in claim 1 in which the restricted passageway is formed with a tapered hole transversely intersecting the passageway and of a larger diameter than the passageway and in which the adjustable means for varying liquid flow through the restrictor passageway comprises a screw having one imperforate end tapered to fit and cooperate with the wall of the tapered hole.

3. Apparatus as claimed in claim 1 in which the fixed walls of the receiver chamber, the restrictor passageway and the follow-up displacement chamber constitute a rigid integral structure.

4. Apparatus as claimed in claim 1 in which the motor valve structure comprises a control spring arranged to exert effective pressure on the valve parallel to the path of its operative movement, and in which the means for actuating and controlling the valve also comprises a structure operatively connected with the movable power element of the motor and arranged for engagement with the valve structure and operable when so engaged to apply to the valve through the control spring a moving force induced by movement of the movable power element of the motor, the said control spring having a working tension greater than the force of the valve biasing means and greater than the excess of the relief means tension over the valve biasing force.

5. Apparatus as claimed in claim 1 in which the valve structure comprises a pair of oppositely-facing movably-mounted abutments and a control spring disposed between the abutments so that the movement of either abutment toward the other will transmit moving force through the spring to the valve structure but in opposite directions, respectively, and in which the means for actuating and controlling the valve also comprises two structures arranged for engagement with the valve structure abutments, respectively, and each operable when so engaged to apply to the valve through the said control spring a moving force induced by movement of the movable power element of the motor, the said control spring having a working tension greater than the force of the valve biasing means and greater than the excess of the relief means tension over the valve biasing force.

References Cited in the file of this patent

UNITED STATES PATENTS

| | | |
|---|---|---|
| 752,491 | Warren | Feb. 16, 1904 |
| 2,303,752 | Meredith | Dec. 1, 1942 |
| 2,560,758 | Burritt | July 17, 1951 |
| 2,580,686 | May | Jan. 1, 1952 |
| 2,607,196 | May | Aug. 19, 1952 |